(12) United States Patent
Lee et al.

(10) Patent No.: US 7,508,613 B2
(45) Date of Patent: *Mar. 24, 2009

(54) METHOD AND APPARATUS FOR BALANCED SHIELD SHUNTS, LEADS AND PADS FOR ELECTRICAL NOISE REDUCTION IN READ HEADS

(75) Inventors: Edward Hin Pong Lee, San Jose, CA (US); Robert Langland Smith, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/686,665

(22) Filed: Mar. 15, 2007

(65) Prior Publication Data
US 2007/0211373 A1     Sep. 13, 2007

Related U.S. Application Data (63) Continuation of application No. 10/254,285, filed on Sep. 25, 2002, now Pat. No. 7,206,154.

(51) Int. Cl.
*G11B 5/02* (2006.01)
*G11B 5/09* (2006.01)
*G11B 5/48* (2006.01)
*G11B 21/16* (2006.01)

(52) U.S. Cl. .............. 360/67; 360/46; 360/246

(58) Field of Classification Search .............. None
See application file for complete search history.

(56) References Cited

U.S. PATENT DOCUMENTS

| | | | | |
|---|---|---|---|---|
| 5,296,980 A | * | 3/1994 | Matsui et al. | 360/97.01 |
| 5,508,614 A | | 4/1996 | Garfunkel et al. | |
| 6,046,876 A | * | 4/2000 | Osafune et al. | 360/67 |
| 6,088,235 A | | 7/2000 | Chiao et al. | |
| 6,324,036 B1 | | 11/2001 | Dill, Jr. et al. | |

* cited by examiner

*Primary Examiner*—Joseph H Feild
*Assistant Examiner*—Daniell L Negrón
(74) *Attorney, Agent, or Firm*—Merchant & Gould (57) ABSTRACT

A symmetrical read element circuit for reducing electrical and magnetic noise using signal processing, such as a differential preamplifier. The circuits are symmetrically created on both sides of the read element so that the noise is balanced on both sides of the read element to allow substantial noise reduction by the signal processing.

20 Claims, 11 Drawing Sheets

METHOD AND APPARATUS FOR BALANCED SHIELD SHUNTS, LEADS AND PADS FOR ELECTRICAL NOISE REDUCTION IN READ HEADS

RELATED APPLICATION

This application is a continuation of U.S. application Ser. No. 10/254,285, filed Sep. 25, 2002, which is hereby incorporated by reference.

BACKGROUND OF THE INVENTION

1. Field of the Invention

This invention relates in general to magnetic transducers, and more particularly to a method and apparatus for forming a symmetrical sensor structure for reducing electrical and magnetic noise.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products.

In the case of the magnetic hard disk drives, the areal density or density of written data bits on the magnetic medium has increased by a factor of more than two million since the first disk drive was applied to data storage. Since 1991, areal density has grown by the well-known 60% compound growth rate, and this is based on corresponding improvements in heads, media, drive electronics, and mechanics.

Magnetic recording heads have been considered the most significant factor in areal-density growth. The ability of these components to both write and subsequently read magnetically recorded data from the medium at data densities well into the $Gbits/in^2$ range gives hard disk drives the power to remain the dominant storage device for many years to come.

Important features of the disk drives include a rotating magnetic disk, write and read heads that are mounted on a slider having an air-bearing surface (ABS), and a suspension arm for suspending the slider above the rotating disk. The read and write heads are connected to processing circuitry that implements the writing and reading functions.

In operation, an actuator swings the suspension arm to position the read and write heads over selected circular tracks on the rotating disk. The suspension arm biases the slider into contact with the surface of the disk when the disk is not rotating but, when the disk rotates, air is swirled by the rotating disk adjacent the air bearing surface (ABS) of the slider causing the slider to ride on an air bearing a slight distance from the surface of the rotating disk.

Prior to 1991, magnetic heads were designed with a single inductive sensor for performing both reading and writing functions. However, the decreasing signal amplitude resulting from higher areal densities (e.g., 500 $Mbits/in^2$ or greater) promoted the development of magnetoresistive (MR), and then giant-magnetoresistive (GMR) read sensors and tunneling magnetoresistive (TMR) sensors, which may all be combined with an inductive head. The inductive head thereafter typically performed the write function. Accordingly, the read sensor was designed with narrower gaps and pole geometries to accommodate write track widths that are typically wider than the corresponding read widths. Hence, the read sensor could remain entirely over a written track resulting in a higher signal to noise ratio.

However, with higher data densities, pole edge effects become more significant. As higher density recording media is used, the read sensor is built smaller to be capable of reading the high-density recording media. As the read sensor is reduced in size, small transient currents due to electrostatic discharge (ESD) are generated and can cause damage to the read sensors.

To prevent damage from the electrostatic discharge, electrical shield shunts are used to protect read sensors. Shield shunts for ESD protection are essentially purposeful shield shorts. These high resistance shield shunts allow accumulated charges to be slowly dissipated. Experimentally, the shield shunts have resulted in yield improvements during fabrication of the sensors.

Unfortunately, shield shunts will also couple unwanted electrical and magnetic noise from outside the file, passing the noise into the file through the shield shunts to the read sensor. The sensor typically picks up this noise; coupling it more to one sensor lead than to the other in the file. This unbalanced noise is difficult to eliminate and results in unwanted electrical and magnetic noise.

It can be seen then that there is a need to improve magnetic and electrical noise cancellation in read heads.

SUMMARY OF THE INVENTION

To overcome the limitations in the prior art described above, and to overcome other limitations that will become apparent upon reading and understanding the present specification, the present invention discloses a method and apparatus for forming a symmetrical sensor structure for reducing electrical and magnetic noise.

According to at least one embodiment of the present invention, symmetrical characteristics are provided on both sides of a read sensor element so that noise coupled onto the sensor leads and/or pads may be balanced allowing substantial noise reduction by signal processing, such as may be provided by differential preamplification. That is, symmetrical characteristics are provided for leads and/or pads about a sensor element. The symmetrical characteristics for leads and/or pads are designed for equal noise pickup and for cancellation of the balanced noise. Herein, symmetrical refers to a design wherein the noise contributions therefrom is balanced on both sides of an axis about a sensor element. However, the term symmetrical, as used herein, is not meant to be limited to a mirrored design. In addition, the term characteristics, as used herein, is meant to include area, volume, length, width, height, layout, thickness, material and fabrication processes of leads, pads and/or other sensor element components.

A method in accordance with the principles of the present invention includes providing a current-in-plane read sensor element within a magnetic head for detecting a magnetically recorded signal and producing a differential read signal in response thereto, providing within the magnetic head a first sensor element signal path including a first shield, the first sensor element signal path having a first physical structure selected to provide first electrical characteristics including a first noise signal component of the read signal on the first sensor element signal path at a first head output terminal and providing within the magnetic head a second sensor element signal path including a second shield, the second sensor element signal path having a second physical structure selected to provide second electrical characteristics including a second noise signal component of the read signal on the second sensor element signal path at a second head output terminal, wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

In another embodiment of the present invention, a read channel is described. The read channel includes a current-in-plane read sensor element disposed within a magnetic head for detecting a magnetically recorded signal and producing a differential read signal in response thereto, a first sensor element signal path including a first shield within the magnetic head, the first sensor element signal path having a first physical structure selected to provide first electrical characteristics including a first noise signal component of the read signal on the first sensor element signal path at a first head output terminal and a second sensor element signal path including a second shield formed within the magnetic head, the second sensor element signal path having a second physical structure selected to provide second electrical characteristics including a second noise signal component of the read signal on the second sensor element signal path at a second head output terminal, wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

In another embodiment of the present invention, a magnetic storage device is described. The magnetic storage device includes magnetic media for storing data thereon, a motor for translating the position of the magnetic media and an actuator for positioning a magnetic head for reading signals from the magnetic media, the magnetic head including a current-in-plane read sensor element disposed within a magnetic head for detecting a magnetically recorded signal and producing a differential read signal in response thereto, a first sensor element signal path including a first shield within the magnetic head, the first sensor element signal path having a first physical structure selected to provide first electrical characteristics including a first noise signal component of the read signal on the first sensor element signal path at a first head output terminal and a second sensor element signal path including a second shield formed within the magnetic head, the second sensor element signal path having a second physical structure selected to provide second electrical characteristics including a second noise signal component of the read signal on the second sensor element signal path at a second head output terminal, wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

These and various other advantages and features of novelty which characterize embodiments of the present invention are pointed out with particularity in the claims annexed hereto and form a part hereof. However, for a better understanding of the embodiments of the present invention, its advantages, and the objects obtained by its use, reference should be made to the drawings which form a further part hereof, and to accompanying descriptive matter, in which there are illustrated and described specific examples of an apparatus in accordance with embodiments of the present invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings, which form a part hereof, and in which is shown by way of illustration the specific embodiment in which embodiments of the present invention may be practiced. It is to be understood that other embodiments may be utilized as structural changes may be made without departing from the scope of embodiments of the present invention.

A method and apparatus is provided for forming a symmetrical sensor structure that balances electrical and magnetic noise. The symmetrical sensor structure includes both leads and pads on both sides of the read element so that the noise is balanced on both leads of the read sensor. This noise may be picked up equally from leads, pads, shields, substrate and disks. Further, the symmetrical design creates symmetrical capacitance, resistance and inductance on both sides of the read sensor balancing the noise contribution from the leads.

Signal processing, such as a differential preamplifier, may then be used to eliminate the balanced noise. Shield shunts may or may not be implemented to improve noise reduction. Herein, symmetrical refers to a design wherein the noise contributions therefrom is balanced on both sides of an axis about a sensor element. However, the term symmetrical, as used herein, is not meant to be limited to a mirrored design. In addition, the term characteristics, as used herein, is meant to include area, volume, length, width, height, layout, thickness, material and fabrication processes of leads, pads and/or other sensor element components.

Figure 1:
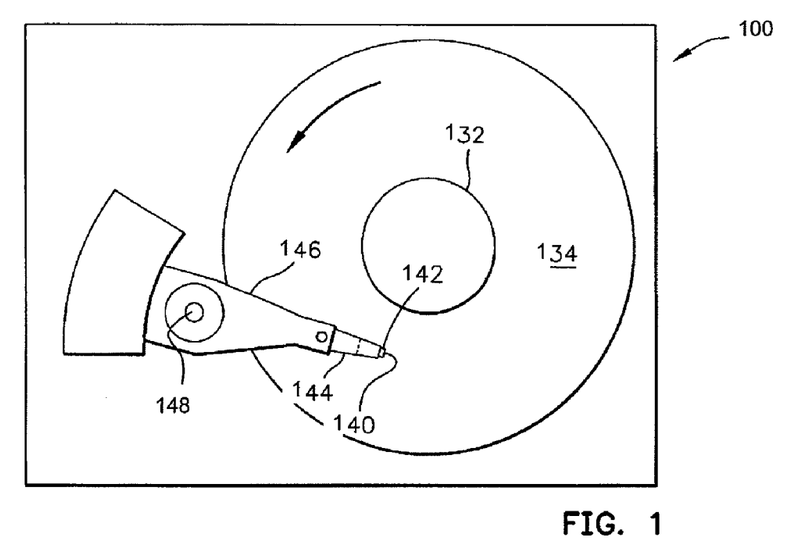
FIG. 1 illustrates a storage system according to an embodiment of the present invention.

FIG. 1 illustrates a storage system 100 according to an embodiment of the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
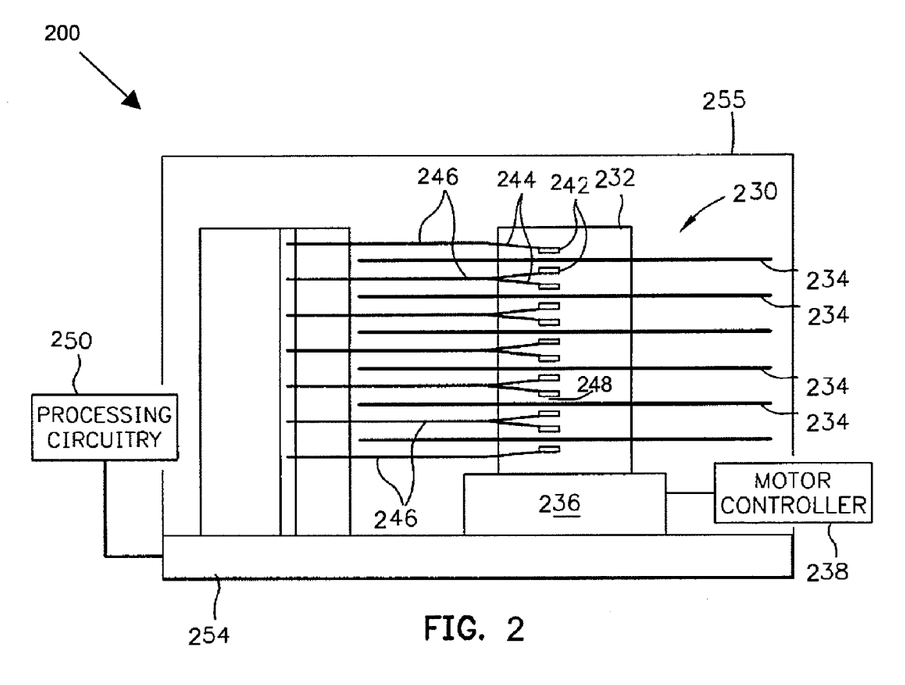
FIG. 2 illustrates one particular embodiment of a storage system according to an embodiment of the present invention.

FIG. 2 illustrates one particular embodiment of a storage system 200 according to an embodiment of the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234, the slider 242 is supported on a thin cushion of air (air bearing) between the surface of the disk 234 and the air-bearing surface (ABS) 248. The magnetic head may then be employed for writing information to multiple circular tracks on the surface of the disk 234, as well as for reading information therefrom.

Figure 3:
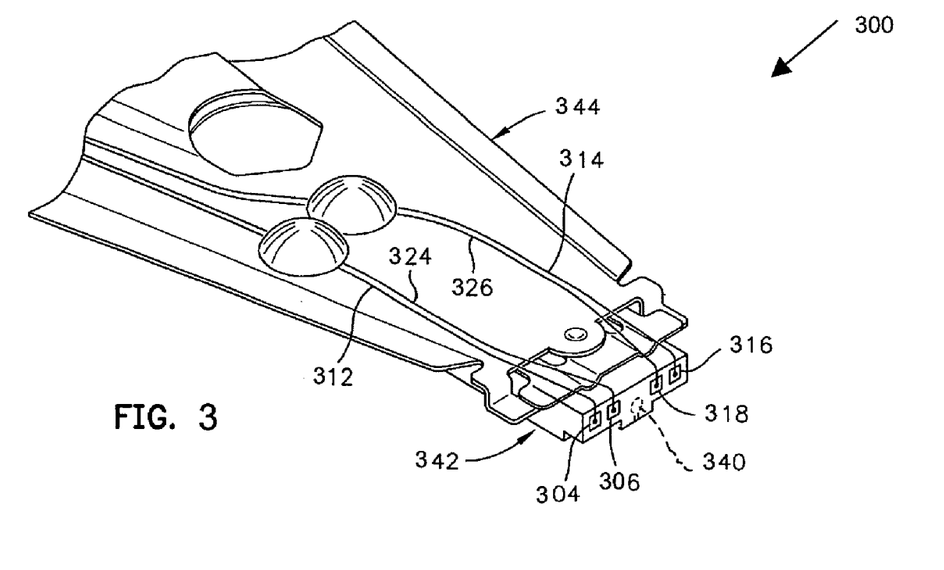
FIG. 3 is an isometric illustrates of a suspension system for supporting a slider and a magnetic head.

FIG. 3 is an isometric illustrates of a suspension system 300 for supporting a slider 342 having a magnetic head mounted thereto. In FIG. 3 first and second solder connections 304 and 306 connect leads from the sensor 340 to leads 312 and 324 on the suspension 344 and third and fourth solder connections 316 and 318 connect the coil to leads 314 and 326 on the suspension 344. However, the particular locations of connections may vary depending on head design.

Figure 4:
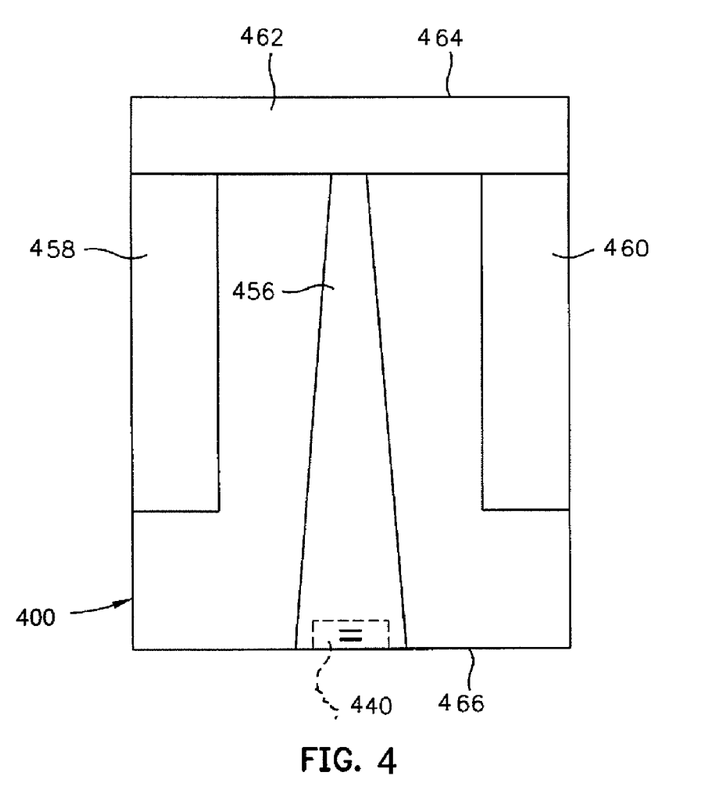
FIG. 4 is an ABS view of the slider and the magnetic head.

FIG. 4 is an ABS view of the slider and the magnetic head 400. The slider has a center rail 456 that supports the magnetic head 440, and side rails 458 and 460. The rails 456, 458 and 460 extend from a cross rail 462. With respect to rotation of a magnetic disk, the cross rail 462 is at a leading edge 464 of the slider and the magnetic head 440 is at a trailing edge 466 of the slider.

Figure 5:
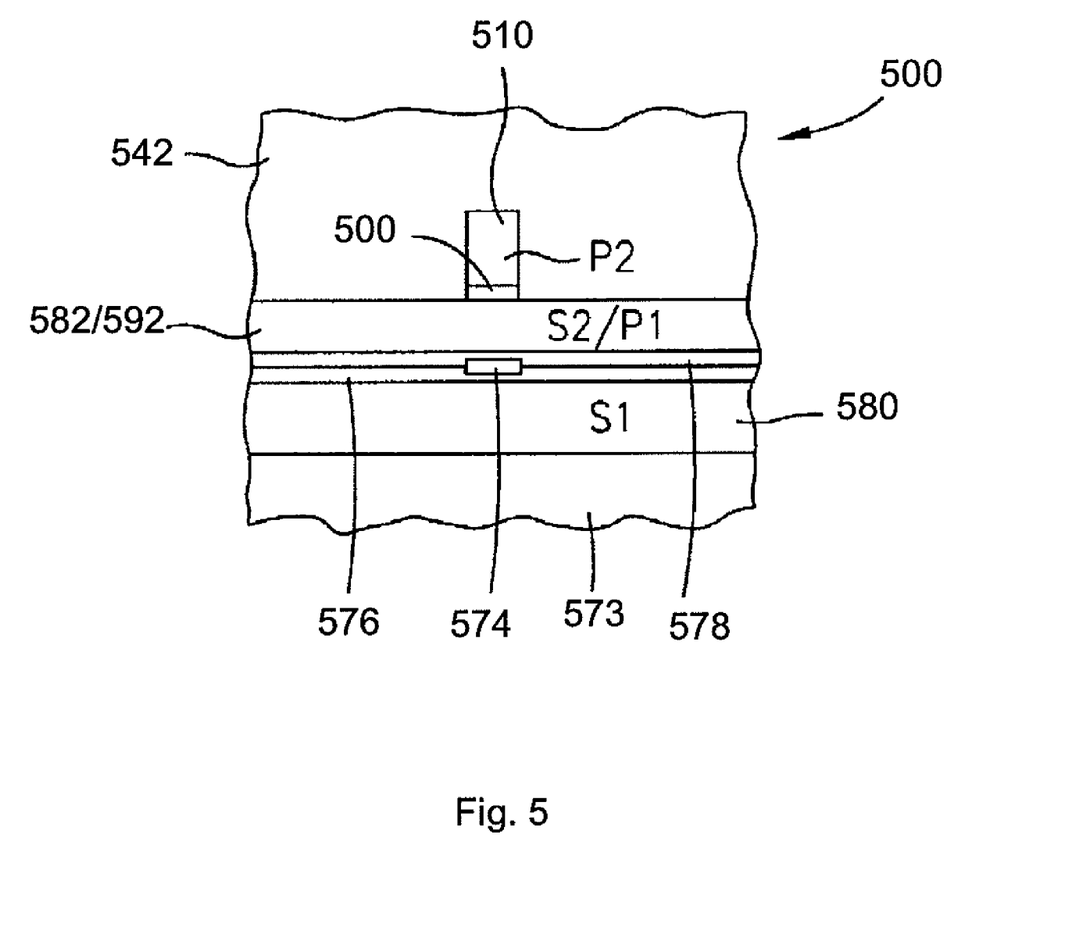
FIG. 5 is an enlarged partial ABS view of the slider to show the read and writer elements of a magnetic head.

FIG. 5 is an enlarged partial ABS view 500 of the slider 542 to show the read and writer elements of a magnetic head. The read sensor 574 is located between first and second gap layers 576 and 578 and the gap layers are located between first shield layer (S1) 580 and second shield layer (S2) 582. A first pole piece layer (not shown) and second pole piece layer (not shown) are magnetically coupled at a back gap (not shown) and have first pole tip (P1) 592 and second pole tip (P2) 510 which are separated by a write gap layer 502 at the ABS. In response to external magnetic fields, the resistance of the sensor 574 changes. A sense current $I_S$ conducted through the read sensor 574 causes these resistance changes to be manifested as potential changes. These potential changes are then processed as readback signals by the processing circuitry 250 shown in FIG. 2. The shielding layers 580 and 582 typically comprise a soft ferromagnetic material such as sendust or NiFe, and are formed by conventional methods such as chemical vapor deposition (CVD) or sputtering or plating.

Shield layer 580 is formed on a substrate, being separated by an undercoat 573. The gap layers 576 and 578 comprise any material suitable for electrically isolating the conductive layers of the read element, e.g., $Al_2O_3$, $SiO_2$, etc.

Figure 6:
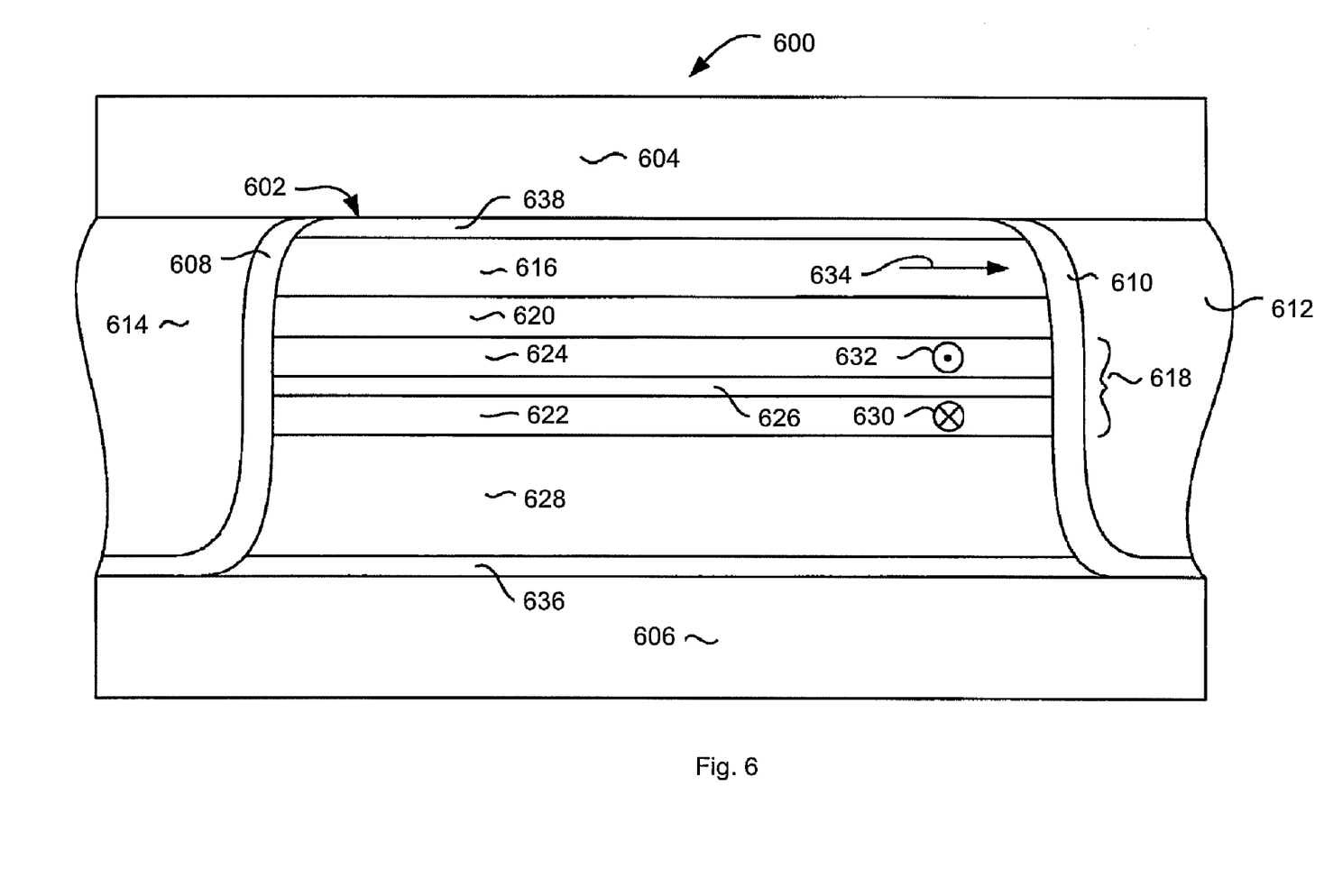
FIG. 6 illustrates a magnetoresistive sensor according to an embodiment of the present invention.

FIG. 6 illustrates a magnetoresistive sensor 600 according to an embodiment of the invention. In FIG. 6, the magnetoresistive sensor 600 includes a magnetoresistive sensor element or sensor stack 602, sandwiched between first and second leads 604, 606. The first and second leads 604, 606 can be constructed of an electrically conductive, magnetic material such as NiFe and can thereby serve as magnetic shields as well as leads. First and second insulation layers 608, 610 are formed at the sides of the sensor stack 602 and extend over at least one of the leads 604, 606. In addition, first and second hard magnetic bias layers 612, 614 are preferably provided at either side of the sensor to provide magnetic biasing for the free layer.

The sensor stack 602 includes a magnetic free layer 616 and a magnetic pinned layer structure 618, and a spacer/barrier layer 620 sandwiched there between. If the sensor 600 is a tunnel valve (TMR) then, the layer 620 is a non-magnetic, electrically insulating barrier layer 620 sandwiched between the free and pinned layers 616, 618. On the other hand, if the sensor 600 is a CPP GMR sensor, then layer 620 is a non-magnetic, electrically conductive spacer layer.

The pinned layer structure may be one of many types of pinned layers, such as a self pinned, antiparallel (AP) coupled pinned layer, and AFM pinned structure, or a simple pinned structure having a single magnetic layer exchange coupled with a layer of antiferromagnetic material (AFM) layer. The pinned layer structure 618 may thus include first and second magnetic layers (AP1 and AP2) 622, 624 separated by and exchange coupled with a non-magnetic, electrically conductive antiparallel coupling layer (AP coupling layer) 626. The AP coupling layer 626 could be constructed of many materials, such as Ru, Cr, etc. The AP coupling layer 626 is configured to provide antiparallel coupling of the first and second magnetic layers 622, 624. The first magnetic layer AP1 is preferably exchange coupled with a layer of antiferromagnetic material (AFM) 628.

This exchange coupling with the AFM layer 628 strongly pins the magnetic moment 630 of the AP 1 layer 622 in a first direction perpendicular to the air bearing surface ABS. The strong antiparallel coupling of the AP1 and AP2 layers strongly sets the magnetic moment 632 of the AP2 layer 624 in a direction opposite that 630 of the AP1 layer 622. The free layer 616 has a magnetic moment 634 that is biased in a direction parallel to the ABS and perpendicular to the moments 630, 632 of the pinned layer 618. The biasing for the moment 624 of the free layer 616 is from magnetostatic coupling with the hard bias layers 612, 614.

The sensor stack 602 may also include a seed layer 636, disposed at the bottom of the sensor stack 602. The seed layer promotes a desired crystalline growth in the subsequently deposited layers, providing improved sensor performance. The sensor stack 602 may also include a capping layer 638, formed at the top of the sensor stack 602. The capping layer 638 serves to protect the other layers of the sensor stack 602 from damage during subsequent manufacturing processes such annealing.

Figure 7A:
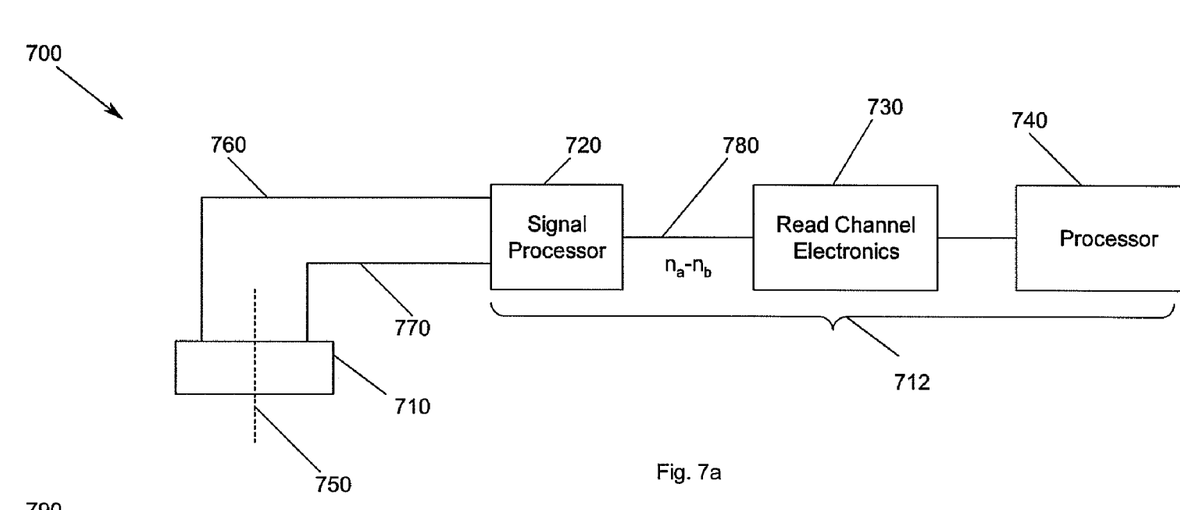
FIGS. 7a-b illustrate noise reduction systems according to an embodiment of the present invention.
Figure 7B:
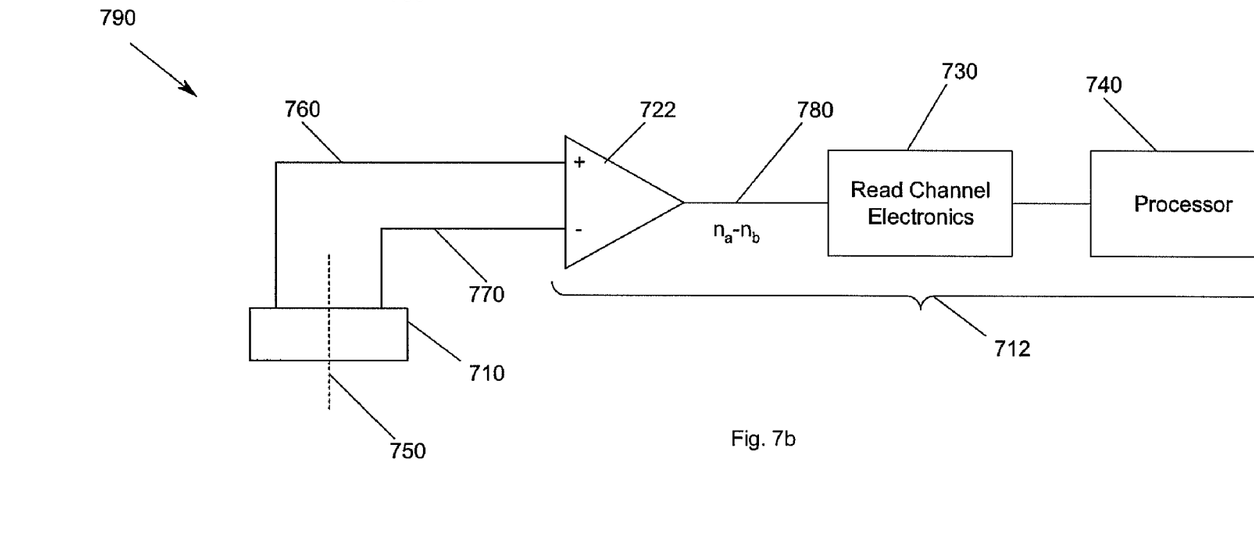

FIGS. 7a-b illustrate noise reduction systems 700, 790 according to an embodiment of the present invention. In FIG. 7a, a thin film read sensor 710 reads information signals from a moving magnetic medium (not shown), such as a rotating magnetic disk. First and second leads 760, 770 are employed for connecting the read sensor 710 to a first and second read pad (not shown). A sense current is applied to the read sensor 710 via the read pads. Magnetic fields from the magnetic medium cause resistance changes in the read sensor 710. The resistance changes cause potential changes across the read pads, which are sensed by a detector or signal processor 720 (such as a differential amplifier 722 of FIG. 7b) of the read channel 712. The read sensor 710 may also be considered part of the read channel. The output of the detector is the readback signal 780.

The read sensor 710, including the read pads (not shown) and leads 760, 770, has a symmetrical structure about an axis 750. The read sensor 710 is coupled to the signal processor 720 via symmetrical leads 760, 770. The signal processor 720 substantially reduces noise to the read sensor 750 from the shields, substrate and disk (not shown). The resulting readback signal 780 is further processed by read channel electronics 730 and/or a processor 740.

FIG. 7b shows the signal processor being a differential amplifier. However, the present invention is not meant to be limited to the noise reduction system 790 having a differential amplifier 722. Rather, the noise reduction system 790 is merely one particular embodiment of the present invention, which is more generally represented by noise reduction system 700 that includes signal processor 720.

Figure 8A:
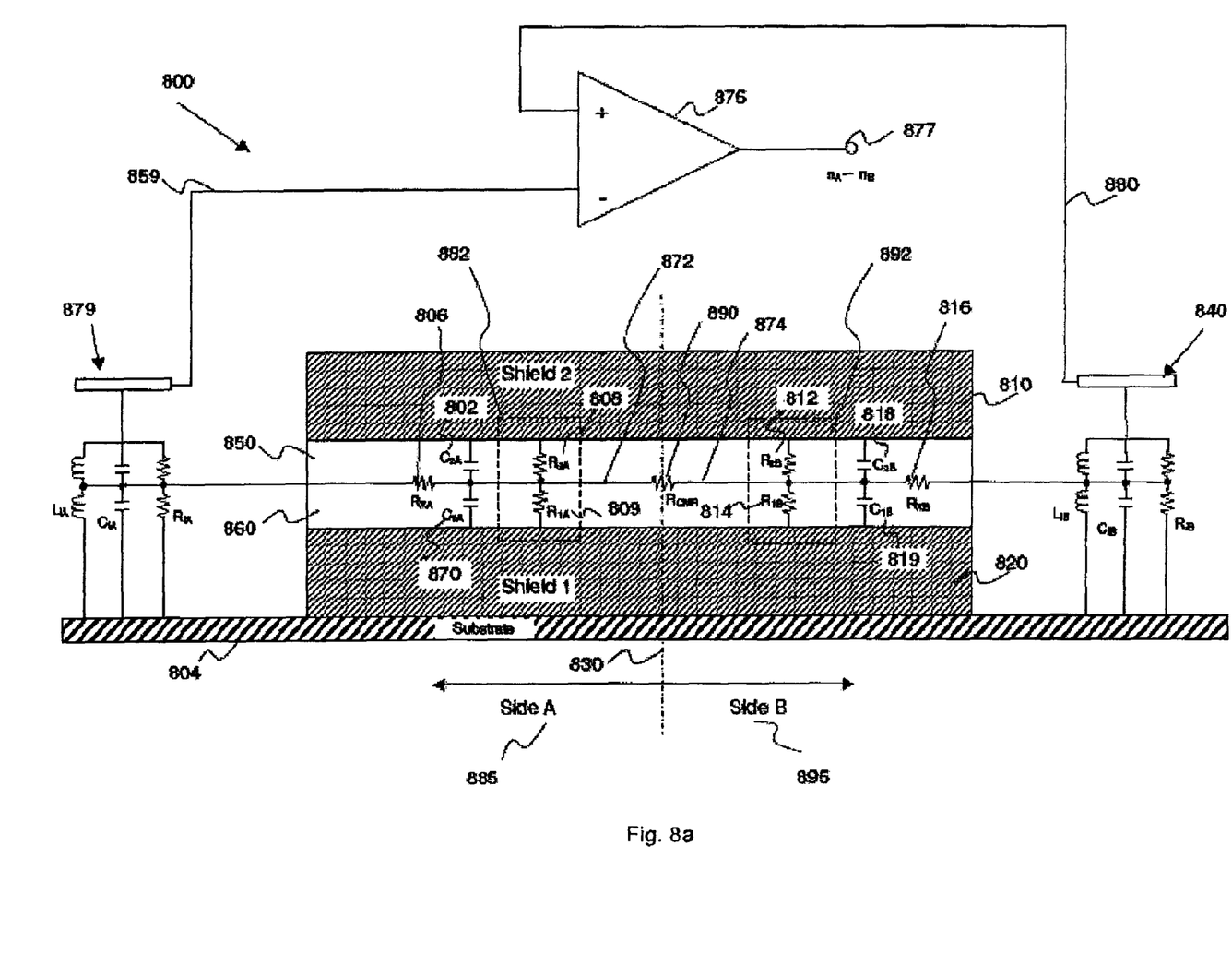
FIG. 8a is a cross-sectional view of a current-in-plane read element layer having associated electrical parameters according to an embodiment of the present invention.

FIG. 8a is a cross-sectional view of a current-in-plane (CIP) read element 800 and the read element's associated electrical parameters according to an embodiment of the present invention. FIG. 8a illustrates a symmetrical design for the read element 800 about an axis of symmetry 830. Herein, symmetrical refers to a design wherein the design is balanced on both sides of an axis about a sensor element, but not necessarily a mirror image. For example, the symmetrical design creates symmetrical characteristics such as capacitances (C), resistances (R) and inductance (L) on both A 885 and B 895 sides. A mirror image of resistance, capacitance and inductance around the axis 830 is one way to balance electromagnetic, RF or magnetic noise. However, the present invention is not limited to these characteristics for reducing noise. For example, an embodiment of the present invention may use characteristics such as symmetrical shield shunts 882, 892 to the leads 872, 874 on both sides of the CIP GMR resistance 890 so that the noise is balanced on both leads 872, 874 of the GMR sensor 890 to improve the reduction of the noise by the differential preamplification 875 of the read channel (see 712 of FIG. 7). That is, the noise signals of leads 872, 874 are balanced and thus the noise can be substantially eliminated by the differential preamplifier 875, wherein the balanced noise signals on leads 872, 874 are subtracted.

In addition, an embodiment of the present invention may be implemented with or without shield shunts 882, 892 to improve noise reduction. For example, by making the head-substrate-to-pad-A 879 coupling equal to that of pad B 840, noise coupled from the substrate 804 will be balanced and substantially reduced by the differential preamplifier 875 as discussed above.

The characteristics of the leads 872, 874 and pads 879, 840, according to an embodiment of the present invention, provides for equal noise pickup on pad A 879 and pad B 840 for subtraction by the differential preamplifier 875. For example, this can be done with a symmetrical lead and pad design (as shown below with FIGS. 9b-d) for symmetrical noise pickup to the read sensor from shields 810, 820, substrate 804 and disk (not shown).

Read element parameters R 808, 809, 812, 814, 806, 816, and C 802, 870, 818, 819 are located in a first gap layer 860 and second gap layer 850, the first and second gap layers 860, 850 being disposed between a first shield layer 820 and a second shield layer 810. These electrical parameters should be made as symmetrical as possible for optimal reduction of noise. That is, for side A 885 and side B 895, $R_{1A}=R_{1B}$, $R_{2A}=R_{2B}$, $R_{XA}=R_{XB}$, $C_{1A}=C_{1B}$, and $C_{2A}=C_{2B}$.

Further, elements $R_{1A}$ 809, $R_{2A}$ 808, $R_{1B}$ 814, and $R_{2B}$ 812 are selected to provide adequate electrostatic discharge (ESD) protection without sacrificing read signal by shunting bias current. That is, the resistance of elements $R_{1A}$ 809, $R_{2A}$ 808, $R_{1B}$ 814, and $R_{2B}$ 812 are not selected to be too small as to create a short (good ESD protection), and not selected to be too large as to eliminate shunting bias current (no ESD protection). Optionally, $C_{1A}$ 870, $C_{2A}$ 802, $C_{1B}$ 819, and $C_{2B}$ 818 may be minimized to reduce noise.

Also, for optimal noise cancellation during differential preamplification 875, balanced resistance $R_{1A}$, $R_{1B}$, inductance $L_{1A}$, $L_{1B}$, and capacitive coupling $C_{1A}$, $C_{1B}$ on both pad A 879 and pad B 840, respectively, should be symmetrical. Thus, noise directed via pad A lead 859 and pad B lead 880 is reduced by differential preamplification 875 as measured at the output 877 of the differential preamplifier 875.

Figure 8B:
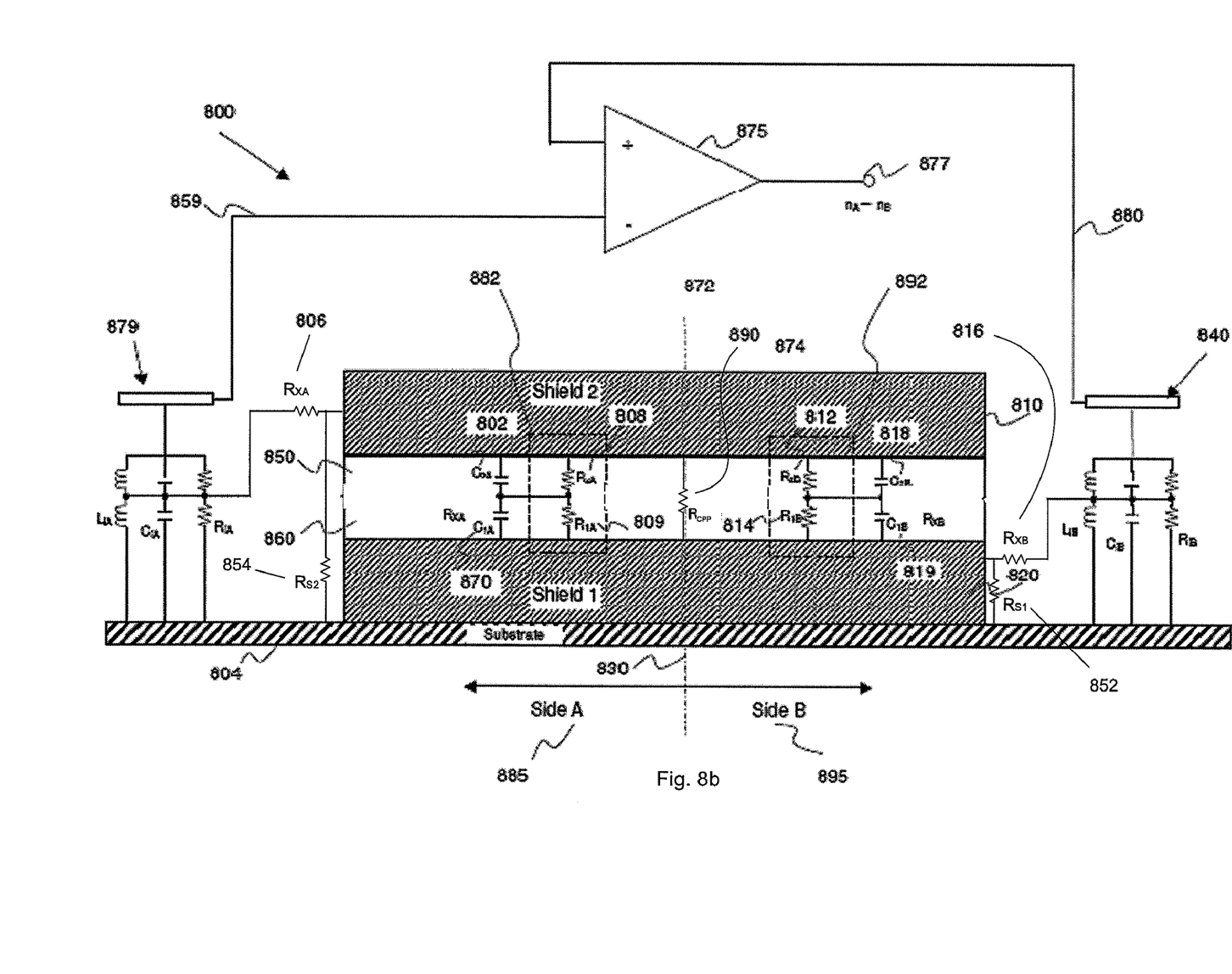
FIG. 8b is a cross-sectional view of a current-perpendicular-to-plane read element layer having associated electrical parameters according to an embodiment of the present invention.

FIG. 8b is a cross-sectional view of a current-perpendicular-to-plane read element layer having associated electrical parameters according to an embodiment of the present invention. FIG. 8b illustrates a symmetrical design for the read element 800 about an axis of symmetry 830. Again, symmetrical refers to a design wherein the design is balanced on both sides of an axis about a sensor element, but not necessarily a mirror image. An embodiment of the present invention may also use characteristics such as symmetrical shield shunts 882, 892 so that the noise is balanced on both shield/leads 810, 820 of the CPP GMR resistance 890 to improve the reduction of the noise by the differential preamplification 875 of the read channel (again, see 712 of FIG. 7). That is, the noise signals of leads shield/leads 810, 820 are balanced and thus the noise can be substantially eliminated by the differential preamplifier 875, wherein the balanced noise signals on shield/leads 810, 820 are subtracted.

Also, an embodiment of the present invention can be used with or without shield shunts 882, 892 to improve noise reduction. For example, by making the head-substrate-to-pad-A 879 coupling equal to that of pad B 840, noise coupled from the substrate 804 will be balanced and substantially reduced by the differential preamplifier 875 as discussed above.

The characteristics of the shield/leads 810, 820 and pads 879, 840, according to an embodiment of the present invention, provides for equal noise pickup on pad A 879 and pad B 840 for subtraction by the differential preamplifier 875.

Read element parameters include R 808, 809, 812, 814, 806, 816, and C 802, 870, 818, 819. The first and second gap layers 860, 850 are disposed between a first shield layer 820 and a second shield layer 810. These electrical parameters should be made as symmetrical as possible for optimal reduction of noise. That is, for side A 885 and side B 895, $R_{1A}=R_{1B}$, $R_{2A}=R_{2B}$, $R_{XA}=R_{XB}$, $C_{1A}=C_{1B}$, and $C_{2A}=C_{2B}$.

Further, elements $R_{1A}$ 809, $R_{2A}$ 808, $R_{1B}$ 814, and $R_{2B}$ 812 are selected to provide adequate electrostatic discharge (ESD) protection without sacrificing read signal by shunting bias current. That is, the resistance of elements $R_{1A}$ 809, $R_{2A}$ 808, $R_{1B}$ 814, and $R_{2B}$ 812 are not selected to be too small as to create a short (good ESD protection), and not selected to be too large as to eliminate shunting bias current (no ESD protection). Optionally, $C_{1A}$ 870, $C_{2A}$ 802, $C_{1B}$ 819, and $C_{2B}$ 818 may be minimized to reduce noise. For further ESD protection, a resistance $R_{S1}$ 852 is disposed between shield 1 820 and the substrate 804, and a resistance $R_{S2}$ 854 between shield 2 810 and the substrate 804. For noise cancellation in the preamplifier 875, resistance $R_{S1}$ 852 should equal resistance $R_{S2}$ 854.

Also, for optimal noise cancellation during differential preamplification 875, balanced resistance $R_{1A}$, $R_{1B}$, inductance $L_{1A}$, $L_{1B}$, and capacitive coupling $C_{1A}$, $C_{1B}$ on both pad A 879 and pad B 840, respectively, should be symmetrical. Thus, noise directed via pad A lead 859 and pad B lead 880 is reduced by differential preamplification 875 as measured at the output 877 of the differential preamplifier 875.

Figure 9A:
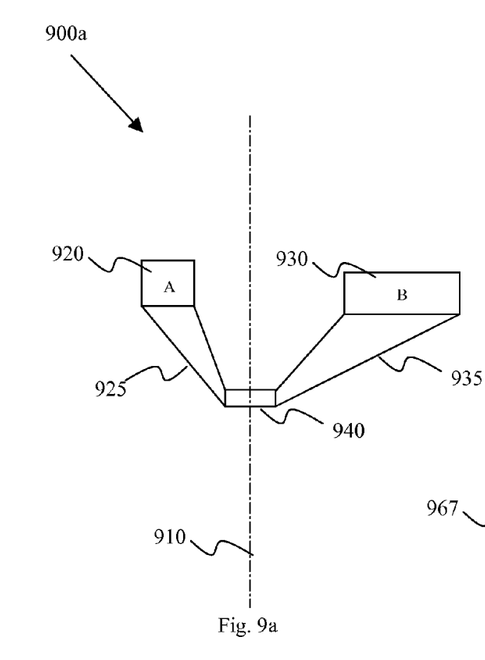
FIG. 9a illustrates a prior art design of unbalanced pads and leads.

FIG. 9a illustrates a prior art design 900a of unbalanced pads and leads. The characteristics of pad A 920 and lead A 925 are not symmetrical with the characteristics of pad B 930 and lead B 935 about the axis of symmetry 910 of the read element 940. This unbalanced design 900a creates noise on pad A 920 that is not equal to the noise on pad B 930, and thus the noise will not be cancelled by the differential amplifier (not shown in FIG. 9a).

Figure 9B:
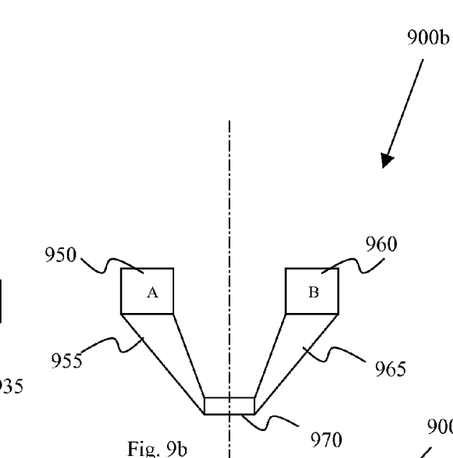
FIGS. 9b-d illustrate a balanced design of pads and leads according to an embodiment of the present invention.
Figure 9C:
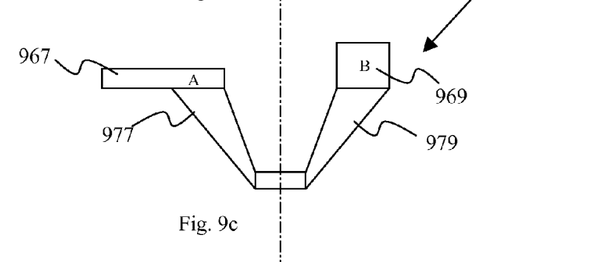
Figure 9D:
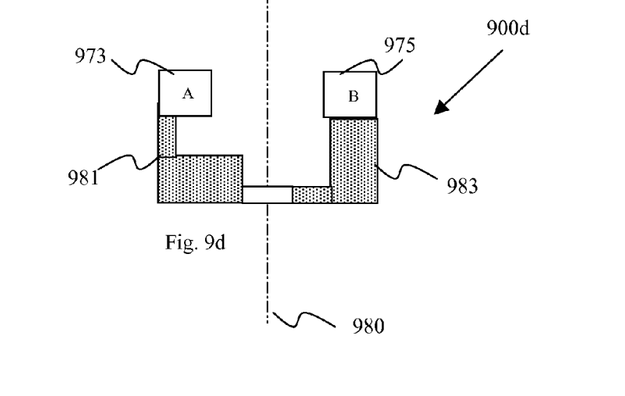

FIGS. 9b-d illustrate balanced designs 900b-d of pads and leads according to an embodiment of the present invention. The balanced designs characteristics of FIG. 900b substantially reduces noise by providing, for example, symmetrical leads 955, 965 and pads 950, 960 that pickup noise from at least shields, substrate and disks, which may be transferred to the read element 970. That is, the design characteristics in FIG. 900b are a mirror image about the axis of symmetry 980 of the read element 970. Pads 950 and 960 are substantially the same as pads 879 and 840 in FIGS. 8a-b. Leads 955 and 965 are substantially the same as leads 872 and 874 in FIGS. 8a-b.

Design characteristics of 900c-d are similar to design characteristics of 900b in that symmetry is provided about the read sensor's axis 980. However, mirror image design characteristics are not required. For example, other characteristics may be included in a symmetrical design including area, volume, length, width, height, layout, thickness, material and fabrication process of leads, pads and other sensor element components. For example, consider designs 900c and 900d. In design 900c, the area of pad A 967 is substantially similar to the area of pad B 969. Also, the area of lead A 977 is substantially similar to the area of lead B 979. In design 900d, the area of pad A 973 is substantially similar to pad B 975. In addition, the area of lead A 981 is substantially similar to the area of lead B 983. Thus, the balanced designs 900b-d of an embodiment of the present invention makes the noise on pad A equal to the noise on pad B so that the noise of pad A and pad B are cancelled by the differential amplifier.

Figure 10:
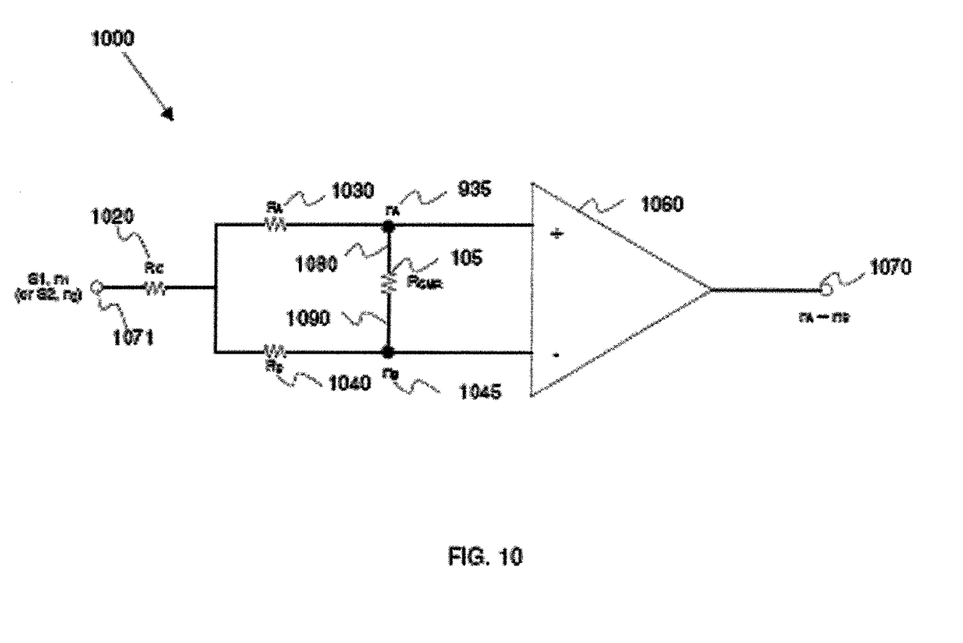
FIG. 10 is one embodiment of a read sensor circuit illustrating noise cancellation according to an embodiment of the present invention.

FIG. 10 is one embodiment of a read sensor circuit 1000 illustrating noise reduction according to an embodiment of the present invention. The circuit in FIG. 10 provides ESD protection using at least shield shunt resistors $R_C$ 1020, $R_A$ 1030, and $R_B$ 1040 (refer to FIG. 12 for $R_A$, $R_B$ and $R_C$). Accordingly, $R_A$ equals $R_B$ and both are symmetrical about the read sensor 1050 so that the same amount of electrical noise at shield 1 ($n_1$, FIG. 12—1210) or at shield 2 ($n_2$, FIG. 12—1220), which is realized at the input 1071 of the circuit 1000, is inserted into the leads 1080, 1090 at $n_A$ 1035 and $n_B$ 1045, respectively, and cancelled at the output 1070 of the differential preamplifier 1060, i.e., $n_A - n_B = 0$.

Figure 11:
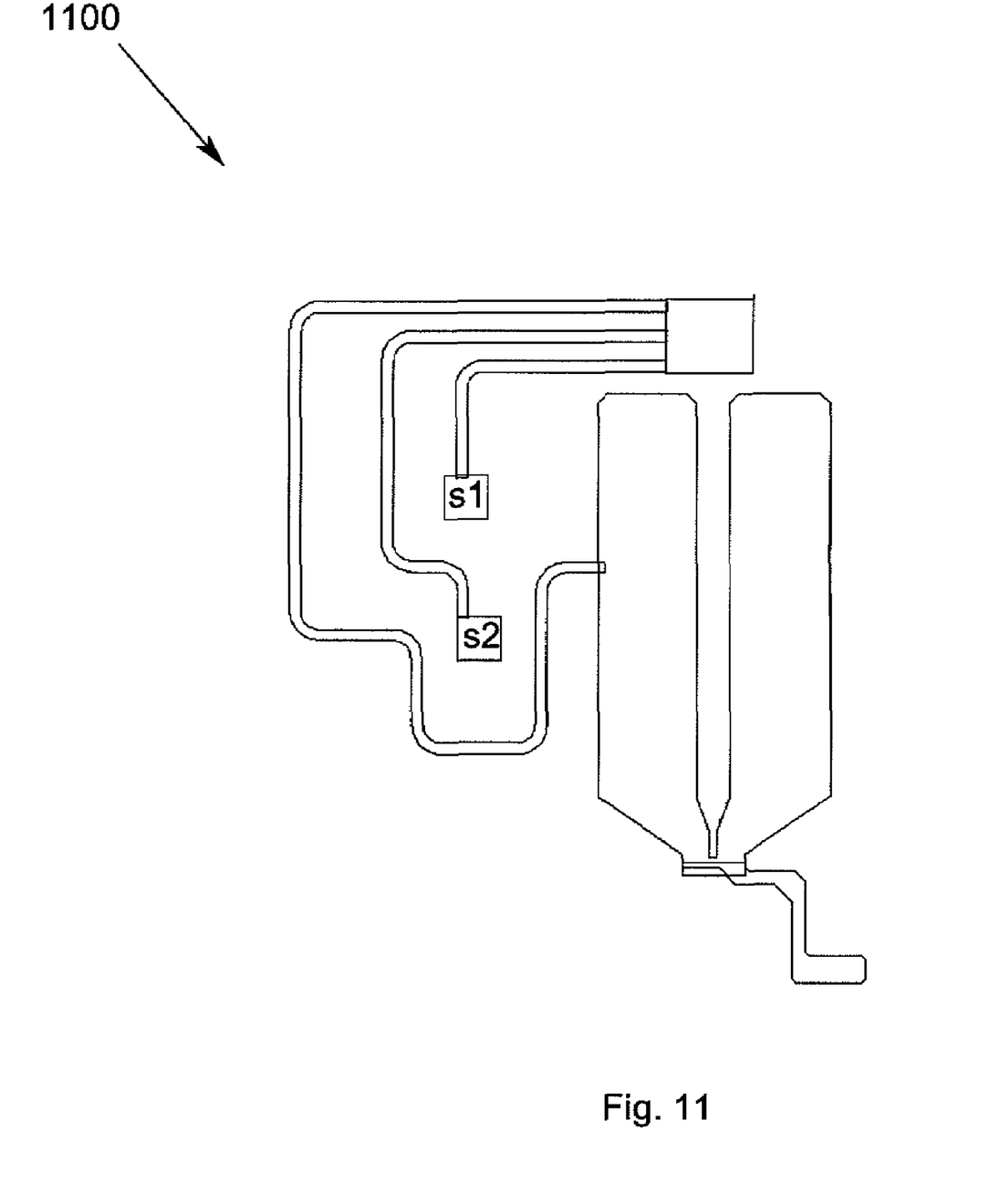
FIG. 11 is a diagram of prior art single sided shield shunts connected to one of the leads to the read head.

FIG. 11 is a diagram 1100 of prior art single sided shield shunts connected to the leads of a read element. In contrast to embodiments of the present invention, the prior art does not use symmetrical design characteristics. Thus, the prior art design is inferior to embodiments of the present invention because, for example, noise coupling through unbalanced shield shunts is accomplished by decreasing the resistance of the shunts, and thereby, as discussed above, a larger resistance eliminates the shunting bias current and sacrifices ESD protection (via the shield shunts). In addition, the prior art uses single ended preamplifiers with shield shunts, which sacrifices using a differential preamplifier for noise cancellation.

Figure 12:
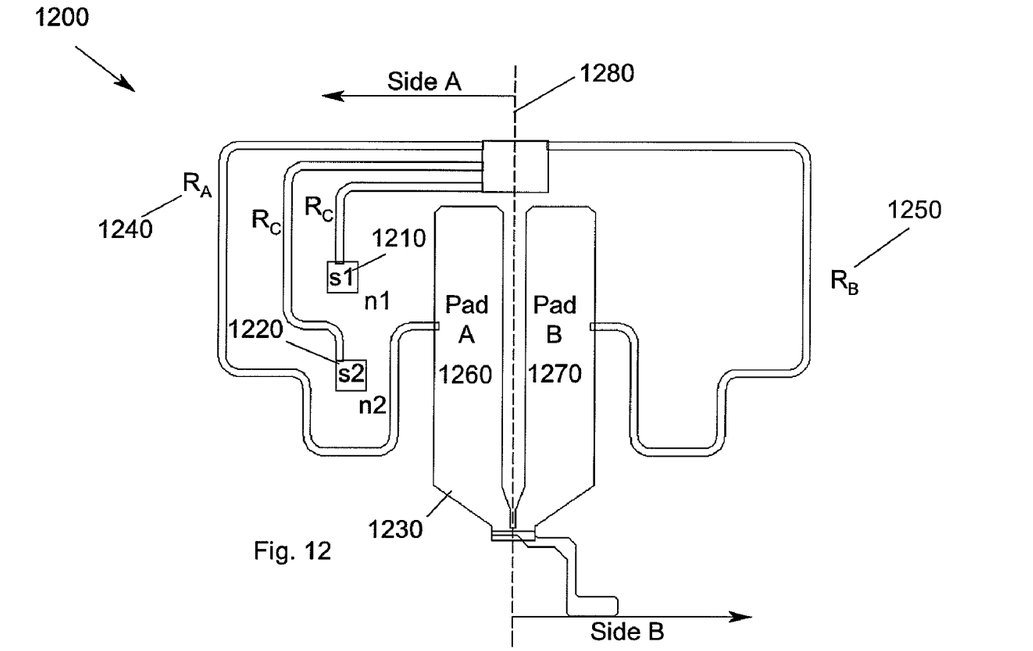
FIGS. 12 and 13 illustrate symmetrical sensor circuits according to an embodiment of the present invention.
Figure 13:
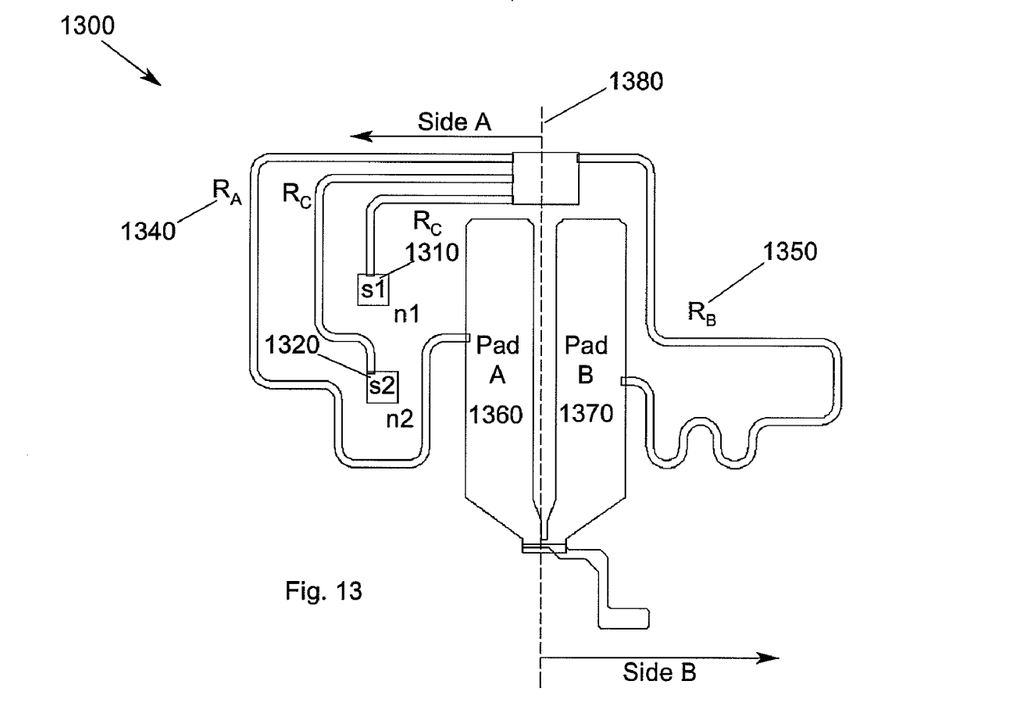

FIGS. 12 and 13 illustrates symmetrical sensor circuits 1200, 1300 according to an embodiment of the present invention. FIGS. 12 and 13 illustrate symmetrical layouts characteristics of a read sensor structures about an axis of symmetry 1280, 1280. FIG. 12 illustrates a mirrored symmetrical design characteristics wherein lead A 1260 and lead B 1270 are symmetrical about the axis of symmetry 1280 and a substantially same amount of electrical noise at shield 1 (1210) or shield 2 (1220) is inserted into shield shunts $R_A$ 1240 and $R_B$ 1250 equally. FIG. 9b illustrates a mirror image of leads A 1260 and B 1270 (wherein leads 955 and 965 correspond to leads 1260 and 1270 respectively). Also, the design shows that the shield shunt $R_A$ 1240 is a mirror image of shield shunt $R_B$ 1250. The symmetrical design allows for subtraction of noise on shield shunts 1240, 1250 and leads 1260, 1270.

FIGS. 11-13 omit pads 879 and 840 as shown in FIGS. 8a-b. Lead 1260 is substantially the same as lead 872 in FIGS. 8a-b and lead 1270 is substantially the same as lead 874 in FIGS. 8a-b.

FIG. 13 illustrates a non-mirrored symmetrical design characteristics wherein lead A 1360 and lead B 1370 are symmetrical about the axis of symmetry 1380, and thus, a substantially same amount of electrical noise at shield 1 (1310) or shield 2 (1320) is inserted into shield shunts $R_A$ 1340 and $R_B$ 1350 equally. Also, the design shows that the pad lead $R_A$ 1340 is substantially symmetrical with pad lead $R_B$ 1350. That is, the area of the lead elements, $R_A$ 1340, $R_B$ 1350, is substantially equal.

In summary, embodiments of a method and apparatus are provided for forming a first and second sensor structure, each structure having a noise contribution. The characteristics of the first and second sensor structure are chosen to be symmetrical about the axis of symmetry of the read sensor to balance electrical and magnetic noise on the sensor leads and pads of the each sensor structure. This noise may be picked up equally from shields, substrate and disks. Then, the balanced noise may be substantial eliminated by canceling the balanced noise signals from the two leads.

The foregoing description of embodiments of the invention has been presented for the purposes of illustration and description. It is not intended to be exhaustive or to limit the embodiments of the present invention to the precise form disclosed. Many modifications and variations are possible in light of the above teaching. It is intended that the scope of embodiments of the present invention be limited not with this detailed description, but rather by the claims appended hereto.

What is claimed is:

1. A method for reducing noise in a differential output signal of a magnetic head, comprising:
   providing a read sensor element within a magnetic head for detecting a magnetically recorded signal and producing a differential read signal in response thereto;
   providing within the magnetic head a first sensor element signal path including a first shield, the first sensor element signal path having a first physical structure selected to provide first electrical characteristics including a first noise signal component of the read signal on the first sensor element signal path at a first head output terminal; and
   providing within the magnetic head a second sensor element signal path including a second shield, the second sensor element signal path having a second physical structure selected to provide second electrical characteristics including a second noise signal component of the read signal on the second sensor element signal path at a second head output terminal; and wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

2. The method of claim 1 further comprising processing the balanced first and second noise signal components to eliminate the first and second noise signal components.

3. The method of claim 2, wherein the processing the first and second noise signal components further comprises differentially preamplifying signals from the first and second sensor signal paths to eliminate the first and second noise signal components thereof.

4. The method of claim 1, wherein the providing a first sensor element signal path within the magnetic head further comprising providing a first pad and the first shield as a first lead and wherein the providing a second sensor element signal path within the magnetic head further comprises providing a second pad and the second shield as a second lead, wherein design characteristics of the first pad is symmetrical with design characteristics of the second pad and design characteristics of the first lead is symmetrical with design characteristics of the second lead.

5. The method of claim 4, wherein the providing a first lead and a first pad and the providing a second lead and a second pad further comprises creating symmetrical capacitances, resistances and inductances in the first and second pads.

6. The method of claim 1 further comprising providing a first shield shunt between the first shield and a substrate and a second shield shunt between the second shield and the substrate, wherein the design characteristics of the first shield shunt and the second shield shunt are configured to be balanced.

7. The method of claim 1, wherein the providing a first and second noise signal components further comprises providing noise generated from at least a substrate, a shield, and a disk, wherein the first and second sensor element signal paths are formed so that the noise generated from at least the substrate, the shield, and the disk for the first and second sensor element signal paths are balanced.

8. A read channel, comprising:
a read sensor element disposed within a magnetic head for detecting a magnetically recorded signal and producing a differential read signal in response thereto;
a first sensor element signal path including a first shield within the magnetic head, the first sensor element signal path having a first physical structure selected to provide first electrical characteristics including a first noise signal component of the read signal on the first sensor element signal path at a first head output terminal; and
a second sensor element signal path including a second shield formed within the magnetic head, the second sensor element signal path having a second physical structure selected to provide second electrical characteristics including a second noise signal component of the read signal on the second sensor element signal path at a second head output terminal;
wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

9. The read channel of claim 8 further comprising a signal processor for processing the balanced first and second noise signal components to eliminate the first and second noise contributions.

10. The read channel of claim 9, wherein the signal processor further comprises a differential amplifier wherein the first and second noise signal components are cancelled by the differential amplifier.

11. The read channel of claim 8, wherein the first sensor element signal path within the magnetic head further comprising a first pad and the first shield as a first lead and wherein the second sensor element signal path within the magnetic head further comprises a second pad and the second shield as a second lead, wherein design characteristics of the first pad is symmetrical with design characteristics of the second pad and design characteristics of the first lead is symmetrical with design characteristics of the second lead.

12. The read channel of claim 11, wherein the first pad and the second pad provide symmetrical capacitances, resistances and inductances.

13. The read channel of claim 8 further comprising a first shield shunt between the first shield and a substrate and a second shield shunt between the second shield and the substrate, wherein the design characteristics of the first shield shunt and the second shield shunt are configured to be balanced.

14. The read channel of claim 13, wherein noise generated from at least the substrate, the shield, and the disk for the first and second sensor element signal paths are balanced.

15. A magnetic storage device, comprising
magnetic media for storing data thereon;
a motor for translating the position of the magnetic media; and
an actuator for positioning a magnetic head for reading signals from the magnetic media, the magnetic head comprising:
a read sensor element disposed within a magnetic head for detecting a magnetically recorded signal and producing a differential read signal in response thereto;
a first sensor element signal path including a first shield within the magnetic head, the first sensor element signal path having a first physical structure selected to provide first electrical characteristics including a first noise signal component of the read signal on the first sensor element signal path at a first head output terminal; and
a second sensor element signal path including a second shield formed within the magnetic head, the second sensor element signal path having a second physical structure selected to provide second electrical characteristics including a second noise signal component of the read signal on the second sensor element signal path at a second head output terminal;
wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

16. The magnetic storage device of claim 15 further comprising a signal processor for processing the balanced first and second noise signal components to eliminate the first and second noise signal components.

17. The magnetic storage device of claim 16, wherein the signal processor further comprises a differential amplifier wherein the first and second noise signal components are cancelled by the differential amplifier.

18. The magnetic storage device of claim 15, wherein the first sensor element signal path within the magnetic head further comprising a first pad and the first shield as a first lead and wherein the second sensor element signal path within the magnetic head further comprises a second pad and the second shield as a second lead, wherein design characteristics of the first pad is symmetrical with design characteristics of the second pad and design characteristics of the first lead is symmetrical with design characteristics of the second lead, wherein the first pad and the second pad provide symmetrical capacitances, resistances and inductances.

19. The magnetic storage device of claim 15 further comprising a first shield shunt between the first shield and a substrate and a second shield shunt between the second shield and the substrate, wherein the design characteristics of the first shield shunt and the second shield shunt are configured to be balanced.

20. The magnetic storage device of claim 19, wherein noise generated from at least the substrate, the shield, and the disk for the first and second sensor element signal paths are balanced.

* * * * *